(12) United States Patent
Yang et al.

(10) Patent No.: US 9,190,111 B2
(45) Date of Patent: Nov. 17, 2015

(54) METHOD AND APPARATUS FOR MODIFYING THE PRESENTATION OF CONTENT

(71) Applicant: ECHOSTAR TECHNOLOGIES L.L.C., Englewood, CO (US)

(72) Inventors: Yunfeng Yang, Aurora, CO (US); Mark Templeman, Parker, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 58 days.

(21) Appl. No.: 13/833,939

(22) Filed: Mar. 15, 2013

(65) Prior Publication Data

US 2014/0270691 A1    Sep. 18, 2014

(51) Int. Cl.

| | |
|---|---|
| H04N 9/80 | (2006.01) |
| G11B 27/28 | (2006.01) |
| H04N 5/76 | (2006.01) |
| H04N 5/783 | (2006.01) |
| H04N 21/472 | (2011.01) |
| H04N 21/81 | (2011.01) |
| H04N 21/845 | (2011.01) |
| G11B 27/10 | (2006.01) |

(52) U.S. Cl.
CPC .............. *G11B 27/28* (2013.01); *G11B 27/105* (2013.01); *H04N 5/76* (2013.01); *H04N 5/783* (2013.01); *H04N 21/47217* (2013.01); *H04N 21/812* (2013.01); *H04N 21/8456* (2013.01)

(58) Field of Classification Search
CPC ............................ G11B 27/105; H04N 21/812
USPC ............. 386/248, 251; 725/35, 137, 141, 134
See application file for complete search history.

(56) References Cited

U.S. PATENT DOCUMENTS

| | | | |
|---|---|---|---|
| 2007/0150919 A1* | 6/2007 | Morishita | 725/35 |
| 2007/0162951 A1* | 7/2007 | Rashkovskiy et al. | 725/134 |
| 2010/0003007 A1* | 1/2010 | Itakura | 386/68 |
| 2010/0162344 A1* | 6/2010 | Casagrande et al. | 725/137 |
| 2012/0072272 A1* | 3/2012 | Kilar et al. | 705/14.4 |

* cited by examiner

*Primary Examiner* — Thai Tran
*Assistant Examiner* — Mishawn Hunter
(74) *Attorney, Agent, or Firm* — Ingrassia Fisher & Lorenz, P.C.

(57) ABSTRACT

In accordance with an exemplary embodiment, a method for processing an audio/video stream includes providing an audio/video stream including at least one segment of a show and at least one interstitial of the show, receiving location information to identify a video location within the audio/video stream, and processing the audio/video stream to identify boundaries of the at least one segment of the show based on the location information. Further, the method includes outputting the segment of the show for presentation by a display device without outputting the interstitial and outputting the interstitial for presentation by the display device subsequent to outputting the segment of the show.

20 Claims, 11 Drawing Sheets

METHOD AND APPARATUS FOR MODIFYING THE PRESENTATION OF CONTENT

TECHNICAL FIELD

The present disclosure generally relates to systems and methods for presenting media content.

BACKGROUND

Digital video recorders (DVRs) and personal video recorders (PVRs) allow viewers to record video in a digital format to a disk drive or other type of storage medium for later playback. DVRs are often incorporated into set-top boxes for satellite and cable television services. A television program stored on a set-top box allows a viewer to perform time shifting functions, and may additionally allow a viewer to skip over commercial breaks and other portions of the recording that the viewer does not desire to watch. However, the user performs this function manually, for example, using a fast forward button of a remote control associated with the DVR. This manual fast forwarding is an inconvenience for the user. Further, manual fast forwarding by a user often leads to inaccurate results, because the user may fast forward past portions of the recording they desire to watch, or may resume playback during the portion of the recording that they want to skip over.

In some instances, the user desires to watch the television program initially without the interruption of commercial breaks, but subsequent to watching the television program, desires to view the commercials that were previously skipped. In this case, the user must not only manually fast forward over the commercial breaks during the initial viewing of the television program, but must then also rewind after the television program is completed to view the commercials. The prior art thus fails to solve this problem in a manner that is easy and convenient for the user.

BRIEF SUMMARY

In accordance with an exemplary embodiment, a method for processing an audio/video stream includes providing an audio/video stream including at least one segment of a show and at least one interstitial of the show, receiving location information to identify a video location within the audio/video stream, and processing the audio/video stream to identify boundaries of the at least one segment of the show based on the location information. Further, the method includes outputting the segment of the show for presentation by a display device without outputting the interstitial and outputting the interstitial for presentation by the display device subsequent to outputting the segment of the show. Alternatively, the method may include generating location information by an user to identify a video location within the audio/video stream (for example, an user can using pause to mark a segment's start and end during playback).

In accordance with another exemplary embodiment, a digital video recorder includes a communication interface that receives an audio/video stream including at least one segment of a show and at least one interstitial of the show, a storage medium, and control logic communicatively coupled to the communication interface and the storage medium that: coordinates storage of the audio/video stream onto the storage medium, receives location information to identify a video location within the audio/video stream, and processes the recorded audio/video stream to identify boundaries of the at least one segment of the show. Further, the digital video recorder includes an audio/video interface communicatively coupled to the control logic that outputs the segment of the show for presentation by a display device without outputting the interstitial, and, subsequently to outputting the segment, outputs the interstitial for presentation by the display device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
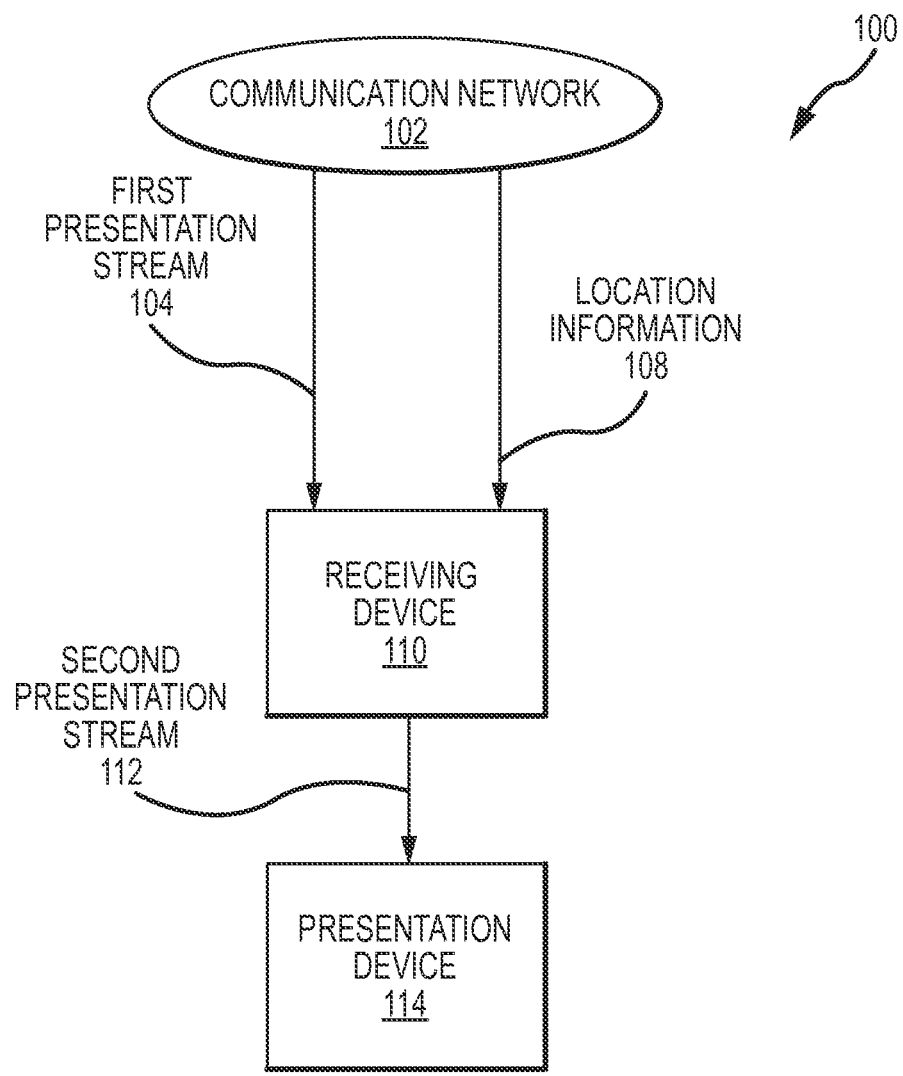
FIG. 1 illustrates an embodiment of a system for presenting content to a user.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments.

The various embodiments described herein generally provide apparatus, systems, and methods that facilitate the reception, processing, and outputting of presentation content. More particularly, the various embodiments described herein provide for the identification of locations in a presentation stream based on metadata associated with the presentation stream. Identified locations within a presentation stream may be utilized to identify boundaries of segments within the presentation stream, such as segments of a show and interstitials (e.g., commercials) of the show. In various embodiments, identified portions of a presentation stream may be utilized for presentation of particular segments of content at a non-real time presentation rate, wherein the interstitials are presented subsequent to the show, instead of being interspersed during the show.

In at least one embodiment, the presentation stream to be received, processed, outputted, and/or communicated may come in any form of presentation data, such as audio data, video data, A/V data, slide shows and the like. Further, the presentation stream may be supplied by any source. A receiving device receives location information referencing a location within the first presentation stream. For example, the location information may be received separately from the first presentation stream. The location information may be supplied separately from the presentation stream. Further, the location information may be supplied by the same source as the presentation stream or a different source as the presentation stream depending on desired design criteria.

In at least one embodiment, the receiving device identifies portions of the presentation stream such as boundaries of segments of content. The receiving device may then perform further processing using these identified portions of the presentation stream, such as changing the presentation rate/order of the segments.

In at least one embodiment, identified segments may be designated for playback at varying presentation rates. For example, some segments may be played back at a real time presentation rate (e.g., 1×), whereas other segments may be played back at a non-real time presentation rate (e.g., 2× or 5×), and other segments may be skipped entirely during play back. The non-real time presentation rate may be faster or slower than the real time presentation rate depending on desired design criteria. For example, some segments may be presented in slow motion, allowing the user more time to experience the content in the segment. In other scenarios, segments may be presented in a fast forward mode (e.g., 5× rate). In still other scenarios, segments may be skipped entirely. For example, the commercials within a program may be automatically fast forwarded through or skipped over by the playback device. Subsequent to the presentation of the program, the fast-forwarded or skipped commercials may then be played. In one example, this may be accomplished by replaying the program but fast forwarding through the program segments (or skipping them entirely) and playing the commercials at a real-time rate. Thus, a user still sees the commercials and the advertiser still receives some benefit from the advertising spot, but the user saves time by watching the commercials after presentation of the program.

As described above, a presentation stream may come in any form of an A/V stream. Exemplary A/V stream formats include Motion Picture Experts Group (MPEG) standards, Flash, Windows Media and the like. It is to be appreciated that the A/V stream may be supplied by any source, such as an over-the-air broadcast, a satellite, or cable television distribution system, a digital video disk (DVD) or other optical disk, the internet or other communication networks and the like.

Generally, an A/V stream is a contiguous block of associated audio and video data that may be transmitted to, and received by, an electronic device, such as a terrestrial ("over-the-air") television receiver, a cable television receiver, a satellite television receiver, an internet connected television or television receiver, a computer, a portable electronic device, or the like. In at least one embodiment, an A/V stream may include a recording of a contiguous block of programming from a television channel (e.g., an episode of a television show). For example, a DVR may record a single channel between 7:00 and 8:00, which may correspond with a single episode of a television program. Generally, an hour long recording includes approximately 42 minutes of video frames of the television program and approximately 18 minutes of video frames of commercials and other content that is not part of the television program.

The television program may include multiple segments of video frames, which are interspersed with interstitials (e.g., commercials). As used herein, interstitials are the video frames of a recording that do not belong to a selected show (e.g., commercials, promotions, alerts, and other shows). A segment of video includes contiguous video frames of the program that are between one or more interstitials.

Further, an A/V stream may be delivered by any transmission method, such as broadcast, multicast, simulcast, closed circuit, pay-per-view, point-to-point (by "streaming," file transfer, or other means), or other methods. Additionally, the A/V stream may be transmitted by way of any communication technology, such as by satellite, wire or optical cable, wireless, or other means. The A/V stream may also be transferred over any type of communication network, such as the internet or other wide area network (WAN), a local area network (LAN), a private network, a mobile communication system, a terrestrial television network, a cable television network, and a satellite television network. In some embodiments, content may be accessed from storage devices, such as hard drives, optical disks, portable storage mediums, e.g., USB flash drives and the like.

In some embodiments, the A/V data may be associated with supplemental data that includes text data, such as closed captioning data or subtitles. Particular portions of the closed captioning data may be associated with specified portions of the A/V data. The text data associated with an A/V stream may be processed to identify portions of the A/V stream. More particularly, the text data may be processed to identify boundaries of portions of the A/V stream. The portions of the A/V stream between identified boundaries may then be designated for presentation to a user at varying presentation rates/orders. In other embodiments, boundaries are identified by metadata transmitted along with the broadcast programming. The boundaries may be identified at a head-end processing facility, such as a broadcast provider, and the location of such boundaries may be transmitted to the receiver along with the broadcast programming. In general, boundaries can be identified by any means known in the art.

FIG. 1 illustrates an embodiment of a system 100 for presenting content to a user. The system of FIG. 1 is operable for identifying locations within a contiguous block of presentation data. Additionally, the system of FIG. 1 is operable for identifying locations in a presentation stream, such as boundaries of segments of the presentation stream. For example, segments of presentation content may be identified and presented at varying presentation rates and in varying presentation orders. The system 100 includes a communication network 102, a receiving device 110, and a presentation device 114. Each of these components is discussed in greater detail below. FIG. 1 may include other devices, components, or elements not illustrated for the sake of brevity.

The communication network 102 may be any communication network capable of transmitting a presentation stream. Exemplary communication networks include television distribution networks (e.g., over-the-air (OTA), satellite and cable television networks), radio broadcast networks, wireless communication networks, public switched telephone networks (PSTN), LANs and WANs providing data communication services. The communication network 102 may utilize any desired combination of wired (e.g., cable and fiber) and/or wireless (e.g., cellular, satellite, microwave and radio frequency) communication mediums and any desired network topology (or topologies when multiple mediums are utilized).

The receiving device 110 of FIG. 1 may be any device capable of receiving a presentation stream from the communication network 102. In at least one embodiment, the communication network 102 comprises a cable or satellite television network for distribution of an A/V stream and the receiving device 110 comprises a set-top box configured to communicate with the communication network 102. In at least one embodiment, the receiving device 110 includes a DVR. In another example, the receiving device 110 may be computer, a personal digital assistant (PDA), or similar device configured to communicate with the internet or comparable communication network 102 to receive and present A/V content. In at least one embodiment, the receiving device 110 includes a radio that receives audio content, via broadcast, multicast or uni-cast, from the communication network 102. While the receiving device 110 is illustrated as receiving content via the communication network 102, in other embodiments, the receiving device may receive, capture, record, access and/or process presentation streams from non-broadcast services, such as optical disks, local storage devices (e.g., hard drives or flash memory), video recorders, DVD players, personal computers, or the internet.

The presentation device 114 may be any device configured to receive a presentation stream from the receiving device 110 and present the presentation stream to a user. Examples of the presentation device 114 include a television, a video monitor or similar device capable of presenting audio and/or video information to a user, a stereo or audio receiver, a projector and the like. The receiving device 110 may be communicatively coupled to the presentation device 114 through any type of wired or wireless connection. Exemplary wired connections include coax, fiber, composite video and high-definition multimedia interface (HDMI). Exemplary wireless connections include WiFi, ultra-wide band (UWB), and Bluetooth. In some implementations, the presentation device 114 may be integrated within the receiving device 110. For example, each of a computer, a television, a stereo with an integrated radio receiver, a PDA and a mobile communication device may serve as both the receiving device 110 and the presentation device 114 by providing the capability of receiving presentation streams from the communication network 102 and presenting the received presentation streams to a user.

In the system 100, the communication network 102 transmits each of a first presentation stream 104, signature data 106, and location information 108 to the receiving device 110. In at least one embodiment, the first presentation stream 104 includes video data, such as a series of digital frames or single images to be presented in a serial fashion to a user. In another embodiment, the first presentation stream 104 includes audio data, such as a series of audio samples to be presented to the user. In some embodiments, the first presentation stream 104 includes A/V data, including a combination of the aforementioned audio data and video data that are presented simultaneously to the user. In one example, the A/V data may be formatted according to one of the MPEG encoding standards, such as MPEG-2 or MPEG-4, as may be used in DBS systems, terrestrial Advanced Television Systems Committee (ATSC) systems or cable systems. However, different audio and video data formats may be utilized in other implementations.

The communication network 102 also transmits location information 108 to the receiving device 110. The location information 108 may be transmitted to the receiving device 110 together or separately. Further, the location information 108 may be transmitted to the receiving device 110 together or separately from the first presentation stream 104. The location information 108 specifies information regarding the location associated with various segments. In at least one embodiment, the location information 108 specifies portions of the first presentation stream 104 that are to be presented at non-real time presentations rates (e.g., faster or slower than 1× rate, skipped, played in a different order, etc.) by the receiving device 110. For example, if the first presentation stream 104 includes one or more segments of a television show interspersed with one or more interstitials, then the location information 108 may identify the locations of the segments, which are to be fast-forwarded through or skipped over during presentation of the television show, and then subsequently played at the real-time rate after the television show has concluded.

In at least one embodiment, the identification process is utilized to identify interstitials within a first presentation stream 104 that are to be presented at different presentation rates and/or in different presentation orders. The location information 108 may identify the boundaries of either the segments or the interstitials depending on desired design criteria. Generally, the beginning boundary of a segment corresponds with the ending boundary of an interstitial. Similarly, the ending boundary of a segment corresponds with the beginning boundary of an interstitial. Thus, the receiving device 110 may utilize the boundaries of segments to identify the boundaries of the interstitials, and vice versa. In some embodiments, the first presentation stream 104 may not include both segments and interstitials, but nonetheless may include portions of content that a user desires to playback at non-real time rates. Thus, the location information 108 may identify which portions of the content of the first presentation stream 104 are to be presented at which presentation rates, and/or which portions of the content are to be presented in which order.

Figure 2:
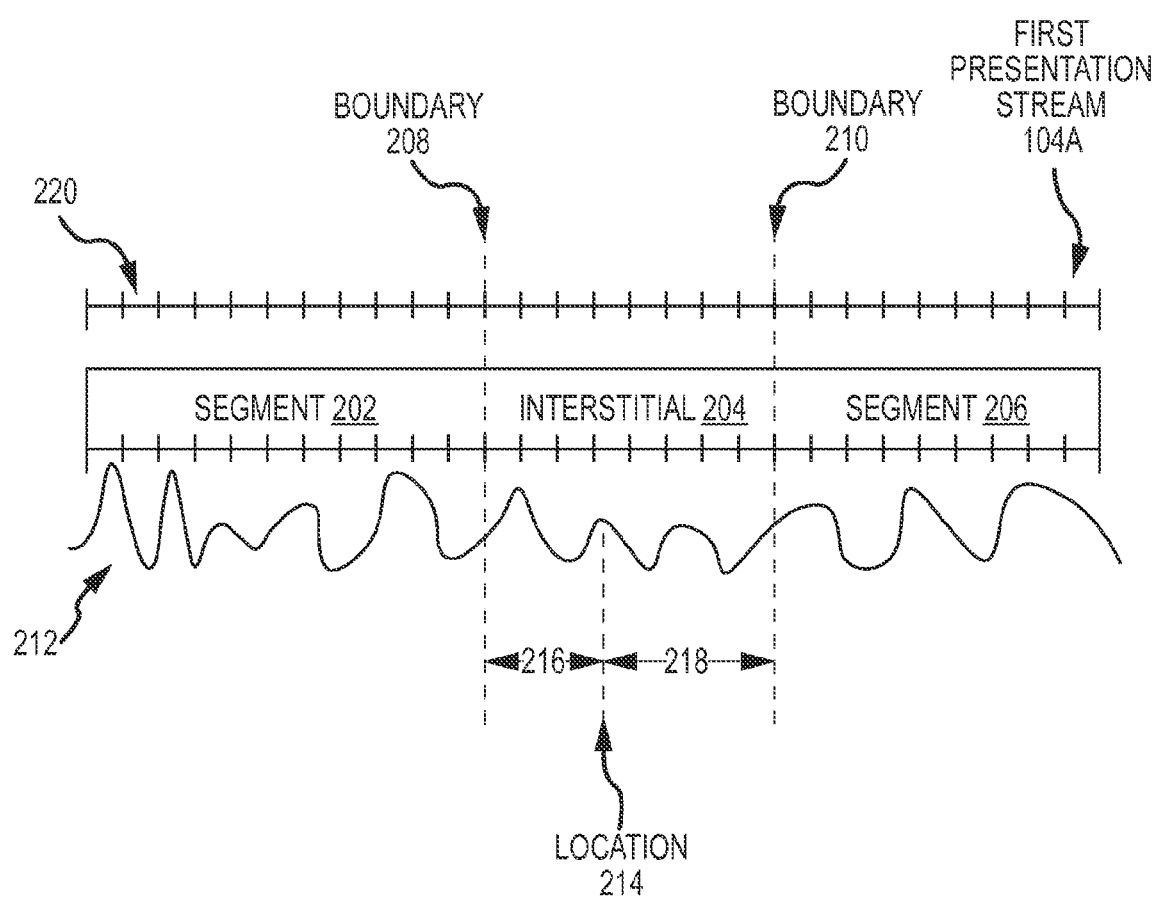
FIG. 2 illustrates an embodiment of a graphical representation of a first presentation stream received by the receiving device.

FIG. 2 illustrates an embodiment of a graphical representation of a first presentation stream received by the receiving device 110. FIG. 2 will be discussed in reference to the system 100 of FIG. 1. The first presentation stream 104A includes a first segment 202 of content, an interstitial 204, and a second segment 206 of content. Also indicated are beginning and ending boundaries 208 and 210 of the interstitial 204, which are indicated to the receiving device 110 (see FIG. 1) by way of the location information 108. It is to be recognized that the boundaries 208 and 210 of the interstitial 204 are also boundaries of the segments 202 and 206. Also illustrated in FIG. 2 is a waveform 212 of the audio data corresponding with the first presentation stream 104A and a time bar 220 that illustrates the presentation time of portions of the first presentation stream 104A. In the illustrated example, the location 214 is in the middle of the interstitial 204. Thus, the receiving device 110 may utilize "offsets" 216 and 218 to identify the boundaries of the interstitial 204 (as well as the boundaries of the segments 202 and 206). Responsive to identifying the boundaries, the receiving device 110 may present the interstitial 204 at a non-real time presentation rate during output of the content, for example skipping the interstitial, and subsequently, once the content playback is completed, play the interstitial 204 at a real time presentation rate.

Figure 3:
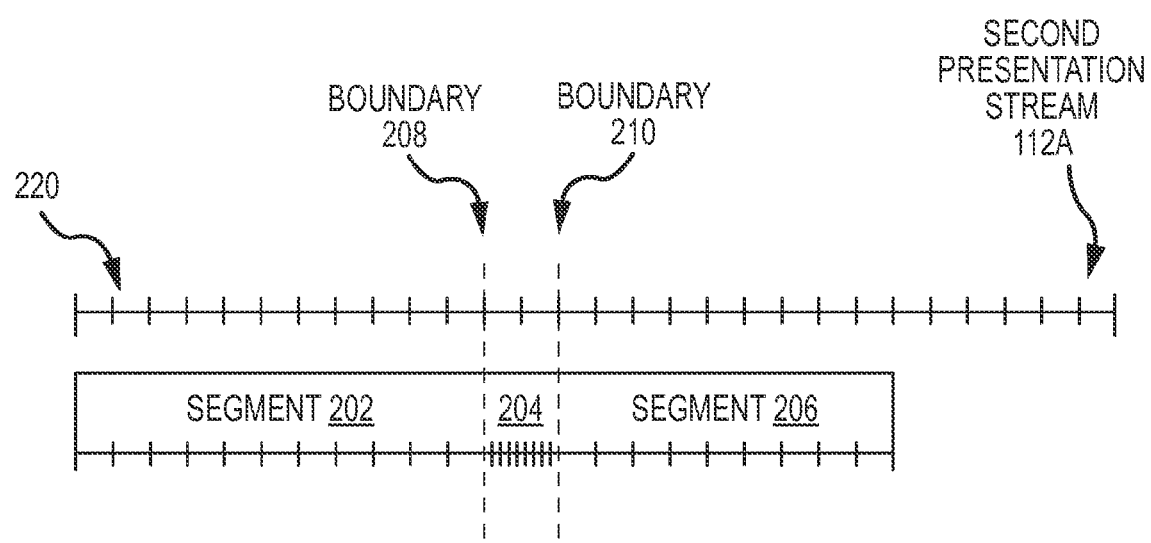
FIG. 3 illustrates an embodiment of a second presentation stream outputted by the receiving device of FIG. 1.

FIG. 3 illustrates an embodiment of a second presentation stream outputted by the receiving device 110 of FIG. 1. As illustrated in FIG. 3, the receiving device 110 presents the interstitial 204 in the second presentation stream 112A at a faster presentation rate than the first presentation stream 104A. In some embodiments, the faster presentation rate is of sufficient speed such that it appears to the viewer that the segment 204 is effectively "skipped over." Thus, the second presentation stream 112A is presented in a shorter duration than the first presentation stream 104A.

Depending on the resiliency and other characteristics of the first presentation stream, the node of the communication network 102 generating and transmitting the location information 108 may issue more than one instance of the location information 108 to the receiving device 110. Each set of location information 108 may point to a particular location within the first presentation stream 104. Each set of location information 108 may include different "off-set" values. Thus, the receiving device 110 may locate the boundaries of a particular segment of the first presentation stream 104 based on identifying multiple locations within the first presentation stream 104. Each set of location information 108 may be issued separately, or may be transmitted in one more other sets.

In accordance with an embodiment, locations and segments of a presentation stream may be identified by processing supplement content, such as text data, associated with the presentation stream. For example, closed captioning data associated with an A/V stream may be processed to identify locations within the A/V stream. In accordance with another embodiment, locations and segments of a presentation stream may be identified by processing metadata broadcast accompanying the television content, such metadata being supplied by the broadcast distributor at a head-end facility.

Figure 4:
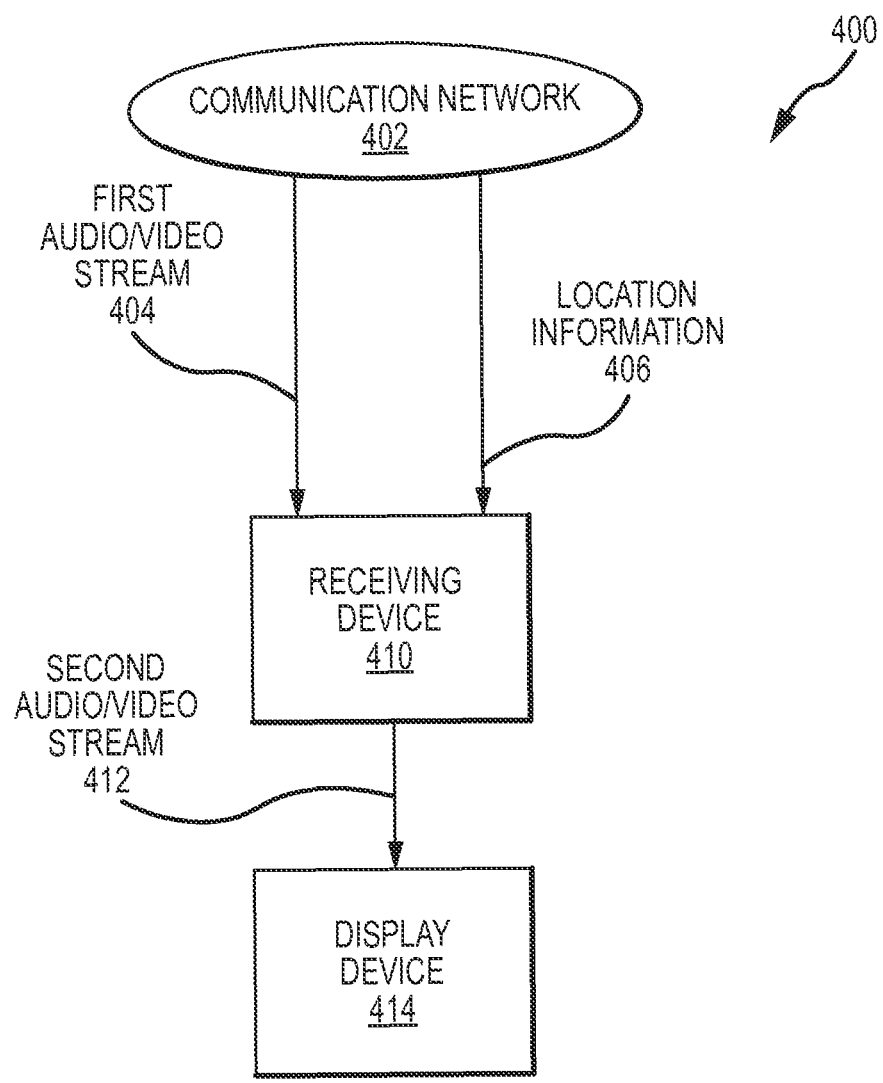
FIG. 4 illustrates an embodiment of a system for presenting content to a user.

FIG. 4 illustrates an embodiment of a system 400 for presenting content to a user. The system of FIG. 4 is operable for identifying A/V content in a contiguous block of A/V data. The system 400 includes a communication network 402, a receiving device 410, and a display device 414. Each of these components is discussed in greater detail below. The system 400 of FIG. 4 may include other devices, components, or elements not illustrated for the sake of brevity.

The communication network 402 may be any communication network capable of transmitting an A/V stream to a receiving device 110. The communication network 402 may be similar to the communication network 102 of FIG. 1. The receiving device 410 of FIG. 4 may be any device capable of receiving an A/V stream from the communication network 402 and outputting the A/V stream for presentation by a display device 414. The receiving device 410 may be similar to the receiving device 110, with additional hardware, software, or control logic provided to identify locations within an A/V stream as described below. The display device 414 may be any device configured to receive an A/V stream from the receiving device 410 and present the A/V stream to a user. The display device 414 may be similar to the presentation device 114 described above. Further discussion of the communication network 402, the receiving device 410, and the display device 414 is omitted herein for the sake of brevity.

In the system 400, the communication network 402 transmits a first A/V stream 404 and location information 406 to the receiving device 410. Also associated with the first A/V stream 404 is supplemental data providing information relevant to the audio data and/or the video data of the first A/V stream 404. In one implementation, the supplemental data includes text data, such as closed captioning data, available for visual presentation to a user during the presentation of the associated audio and video data of the first A/V stream 404. In some embodiments, the text data may be embedded within the first A/V stream 404 during transmission across the communication network 402 to the receiving device 410. In one example, the text data may conform to any text data or closed captioning standard, such as the Electronic Industries Alliance 608 (EIA-608) standard employed in transmissions or the EIA-708 standard. When the text data is available to the display device 414, the user may configure the display device 414 to present the text data to the user in conjunction with the video data. In other embodiments, the supplemental data includes metadata identifying boundaries as supplied by a content provider at a head-end facility.

Each of a number of portions of the text data or metadata may be associated with a corresponding portion of the audio data or video data also included in the A/V stream 404. For example, one or more frames of the video data of the A/V stream 404 may be specifically identified with a segment of the text data or metadata included in the first A/V stream 404. A segment of text data or metadata (e.g., a string of bytes) may include displayable text strings and/or non-displayable data strings (e.g., codes). As a result, multiple temporal locations within the A/V stream 404 may be identified by way of an associated portion of the text data or metadata. For example, a particular text string or phrase within the text data may be associated with one or more specific frames of the video data within the first A/V stream 404 so that the text string is presented to the user simultaneously with its associated video data frames. In another example, the metadata provides code information to the receiver simultaneously with video and audio data to identify segment boundary locations to the content receiver.

The communication network 402 also transmits location information 406 to the receiving device 410. The location information 406 may be transmitted to the receiving device 410 together or separately from the first A/V stream 404. The location information 406 specifies locations within the first A/V stream 404 that are to be presented at varying presentation rates during presentation of the A/V data of the first A/V stream 404 by the receiving device 410. For example, if the first A/V stream 404 includes one or more segments of a television show interspersed with one or more interstitials, then the location information 406 may identify the locations of the segments, which are to be presented at a first presentation rate or in a first presentation order, and/or identify the locations of the interstitial, which are to be presented at a second presentation rate or in a second presentation order. The receiving device 410 is operable for processing the text data and/or metadata to identify the portions of the first A/V stream 404 and identify the presentation rates/orders for each of the portions of the first A/V stream 404. The receiving device 410 outputs a second A/V stream 412 that includes the identified portions presented at varying ratesorders for presentation by the display device 414.

Figure 5:
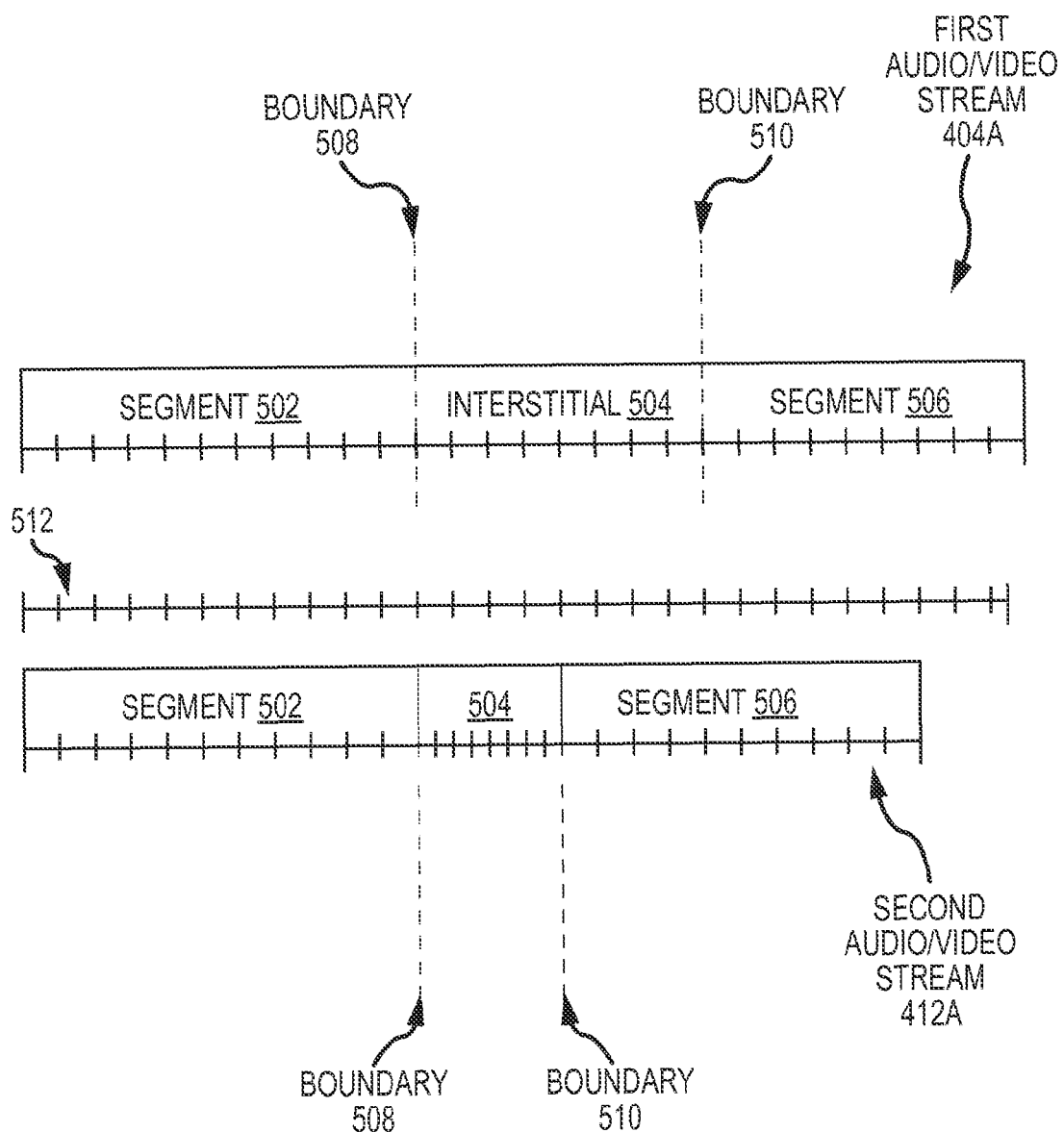
FIG. 5 illustrates an embodiment of a graphical representation of the first A/V stream received by the receiving device, and a second A/V stream outputted by the receiving device.

FIG. 5 illustrates an embodiment of a graphical representation of the first A/V stream 404A received by the receiving device 410, and a second A/V stream 412A outputted by the receiving device 410. More particularly, FIG. 5 illustrates an embodiment in which an interstitial from the first A/V stream 404A is presented at a faster presentation rate (for example, a rate that effectively "skips through" such stream) during presentation of the second A/V stream 412A and the segment 506 is presented at a slower presentation rate than in the first A/V stream 404A. FIG. 5 will be discussed in reference to the system 400 of FIG. 4.

The first A/V stream 404 includes a first A/V segment 502 of a show, an interstitial 504, and a second A/V segment 506 of the show. The time bar 512 illustrates the duration for each of the segment 502, interstitial 504, and the segment 506. Also indicated are beginning and ending boundaries 508 and 510 of the interstitial 504, which are indicated to the receiving device 410 (see FIG. 4) by way of the location information 406. It is to be recognized that the boundaries 508 and 510 of the interstitial 504 are also boundaries of the segments 502 and 506. The supplemental data of the A/V stream 404A is not shown in FIG. 5 to simplify the diagram. Alternatively, location information 406 can be generated by a user to identify a video location within the audio/video stream (for example, an user can using pause to mark a segment's start and end during playback).

In the specific example of FIG. 5, the boundary 508 (e.g., the ending boundary of segment 502) is the starting point at which the presentation of the interstitial 504 is to be modified during presentation in the second A/V stream 412A, for example by fast forwarding or skipping the interstitial 504 entirely. Likewise, the boundary 510 (e.g., the beginning boundary of segment 506) is the ending point at which the interstitial 504 is to be presented at the modified presentation rate. As illustrated, the interstitial 504 is presented at a faster presentation rate in the second A/V stream 412A, which, in one embodiment, can include skipping past the interstitial 504 entirely. As a result of the modifications to the presentation rates of the interstitial 504, the second A/V stream 412A is shorter in duration than the first A/V stream 404A.

The boundaries 508 and 510 are identified based on the location of one or more video locations within the first A/V stream 404A. More particularly, the beginning and ending boundaries of a segment (or interstitial) of the first A/V stream 404A may be specified by a single video location within the segment. Thus, each segment may be identified by a unique video location within the first A/V stream 404A.

In some embodiments, multiple video locations may be utilized to specify the beginning and ending boundaries of a segment. In at least one embodiment, a single video location is utilized to identify the beginning and ending boundaries of a segment. The video location may be located at any point within the segment, and offsets may be utilized to specify the beginning and ending boundaries of the segment relative to the video location. In one implementation, a human operator, of a content provider of the first A/V stream 404A, bears responsibility for selecting the location and/or the offsets. In other examples, video location and offset selection occurs automatically under computer control, or by way of human-computer interaction. A node within the communication network 402 may then transmit the selected location information 406, along with the forward and backward offset data.

Figure 6:
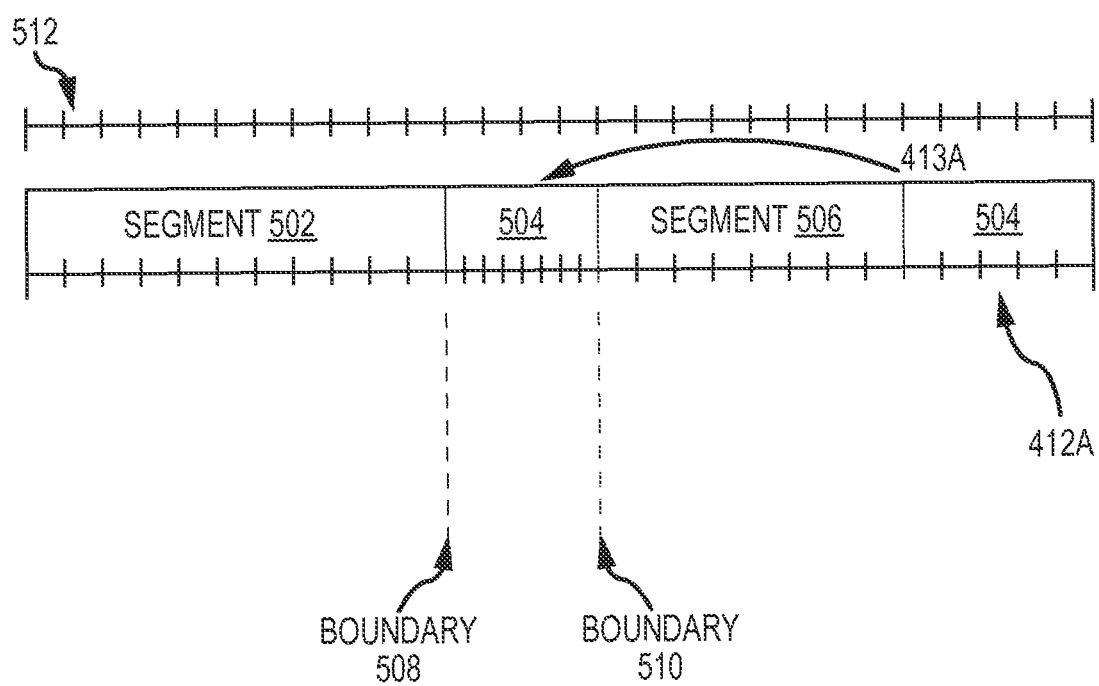
FIG. 6 illustrates an embodiment in which the boundaries of a segment of an A/V stream are identified based on a text string included within the text data associated with the A/V stream.

FIG. 6 illustrates an embodiment in accordance with the present disclosure. As noted above with regard to FIG. 5, two segments are present in the stream 412A, segments 502 and 506. As above, these are played at a real-time rate. Further included in the stream is the interstitial 504. The interstitial is played back at a non-real time rate, such as fast-forwarded or skipped entirely. Thereafter, upon completion of playback of the segment 506 at the real-time rate, the stream may re-wind or "skipped backwards", as indicated by arrow 413A, to the location of the beginning of interstitial 504, i.e., boundary 508. Then, the interstitial may be played back at a real-time rate, as indicated in the illustration subsequent to the playback of segment 506. It is noted that the stream itself is not modified, rather, only the playback order/rate are modified, such that it gives the appearance to the viewer that the interstitial has been moved to or added to the end of the stream 412A; however, this is accomplished by rewinding or skipping backward, and playing the previously skipped or fast-forwarded interstitial 504, not by modifying the stream 412A.

Figure 7:
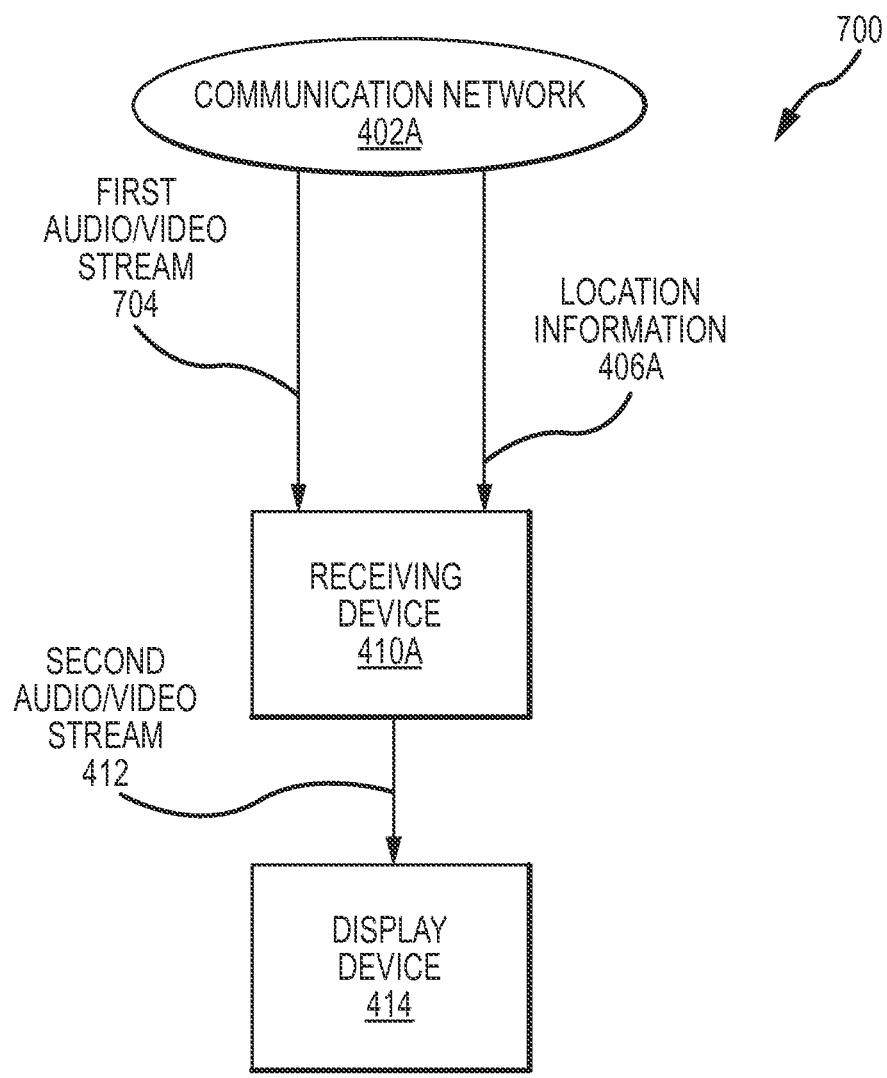
FIG. 7 illustrates an embodiment of a system for presenting content to a user.

Described above, various techniques for identifying locations within presentation stream have been noted. The techniques may be utilized together to enhance the location identification process performed by a receiving device. FIG. 7 illustrates an embodiment of a system 700 for presenting content to a user. The system of FIG. 7 is operable for presenting A/V content from a contiguous block of A/V data at varying presentation rates. The system 700 includes a communication network 402A, a receiving device 410A, and a display device 414. Each of these components is discussed in greater detail below. The system 700 of FIG. 7 may include other devices, components or elements not illustrated for the sake of brevity. Discussion of components common to FIG. 4 is omitted herein for the sake of brevity.

The receiving device 410A is operable to receive a first A/V stream 404 and location information 406A. The location information 406A references closed captioning data to identify a video location within the first A/V stream 404. Additionally, the location information includes at least one off-set specified relative to the video location. The receiving device 410A is operable to identify portions of the A/V stream 404 based on the location information 406A. Responsive to identifying portions of the first A/V stream 404, the receiving device 410 presents particular portions of the first AV stream 404 at varying presentation rates to output a second A/V stream 412 for presentation by the display device 414.

Figure 8:
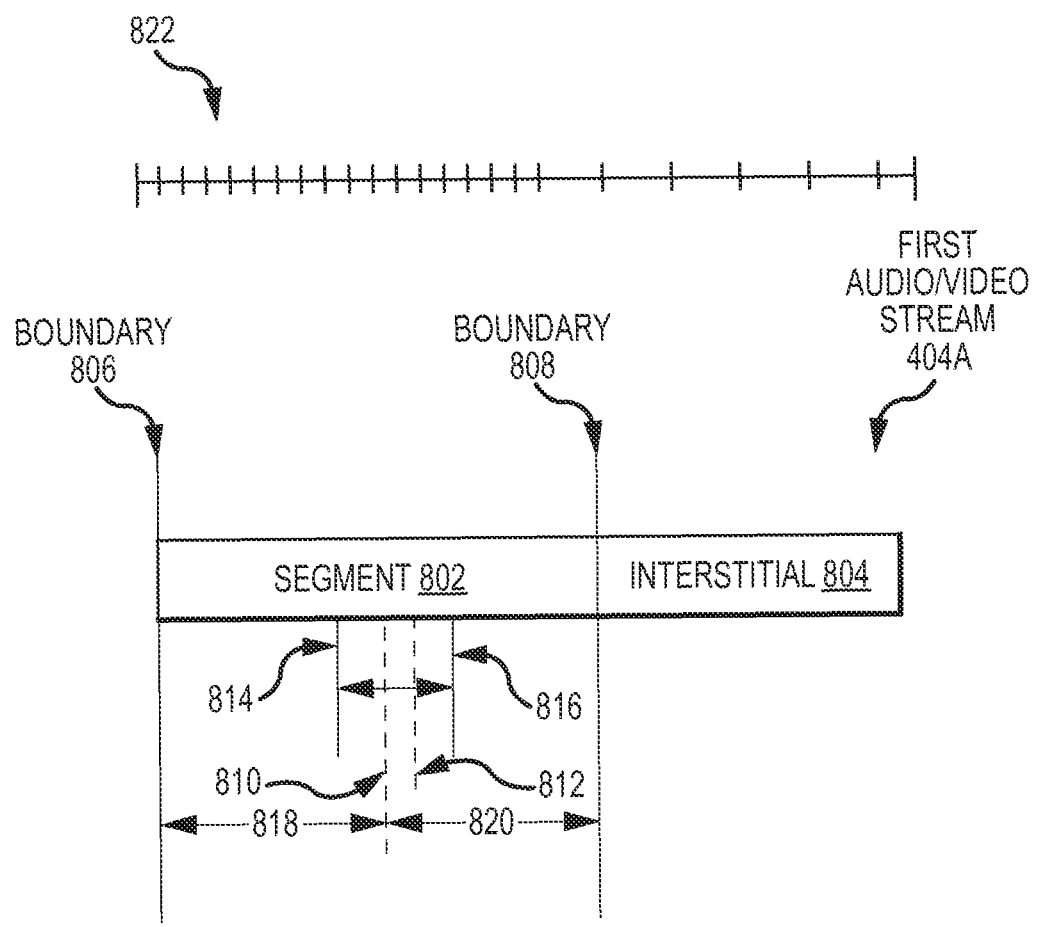
FIG. 8 illustrates a graphical representation of the first presentation stream of FIG. 7.

FIG. 8 illustrates a graphical representation of the first presentation stream of FIG. 7. The first A/V stream 404A includes a segment 802 and an interstitial 804. The segment 802 is bounded by boundaries 806 and 808. The location information 406 specifies a video location 810 utilized to identify the boundaries 806 and 808. First, the receiving device 410A processes metadata associated with the first A/V stream 404 to identify an intermediate location 812 within the first A/V stream 404. Based upon locating the intermediate location 812, the receiving device 410A identifies search boundaries 814 and 816. The video location 810 is located within the search boundaries 814 and 816. In at least one embodiment, the search boundaries 814 and 816 are specified as off-sets relative to the intermediate location 812.

Responsive to identifying the boundaries 814 and 816, the receiving device 410A processes the content of the first A/V stream 404 within the boundaries 814 and 816 to identify the video location 810 corresponding with the signature data 706. The processing of the content within the search boundaries may be performed as described above in reference to FIG. 1. Responsive to identifying the video location 810, the receiving device 410A utilizes off-sets 818 and 820 to identify the boundaries 806 and 808 of the segment 802.

The receiving device 410A may then operate to output the content within the boundaries 806 and 808 at a first presentation rate. In at least one embodiment, the first presentation rate is a real-time presentation rate of the segment 802, e.g., the same presentation rate of the segment 802 as originally transmitted to the receiving device 410A. The receiving device 410A may then output the interstitial 804 at a second presentation rate. In at least one embodiment, the second presentation rate is greater than the first presentation rate. In other words, the interstitial 804 is shown at a faster rate than the segment 802. Similar processes may be performed to identify the boundaries of other portions of the first A/V stream 404 to determine a presentation rate to present theother portions of the first A/V stream 404. Thereafter, as described above with regard to FIG. 6, subsequent to the real-time presentation of all segments (i.e., 802), the interstitials may be played-back at a real-time rate, which may be accomplished by rewinding or skipping backward in the stream 404A to the beginning boundary of the interstitial 804, and thereafter playing the interstitial 804 at a real-time rate.

Figure 9:
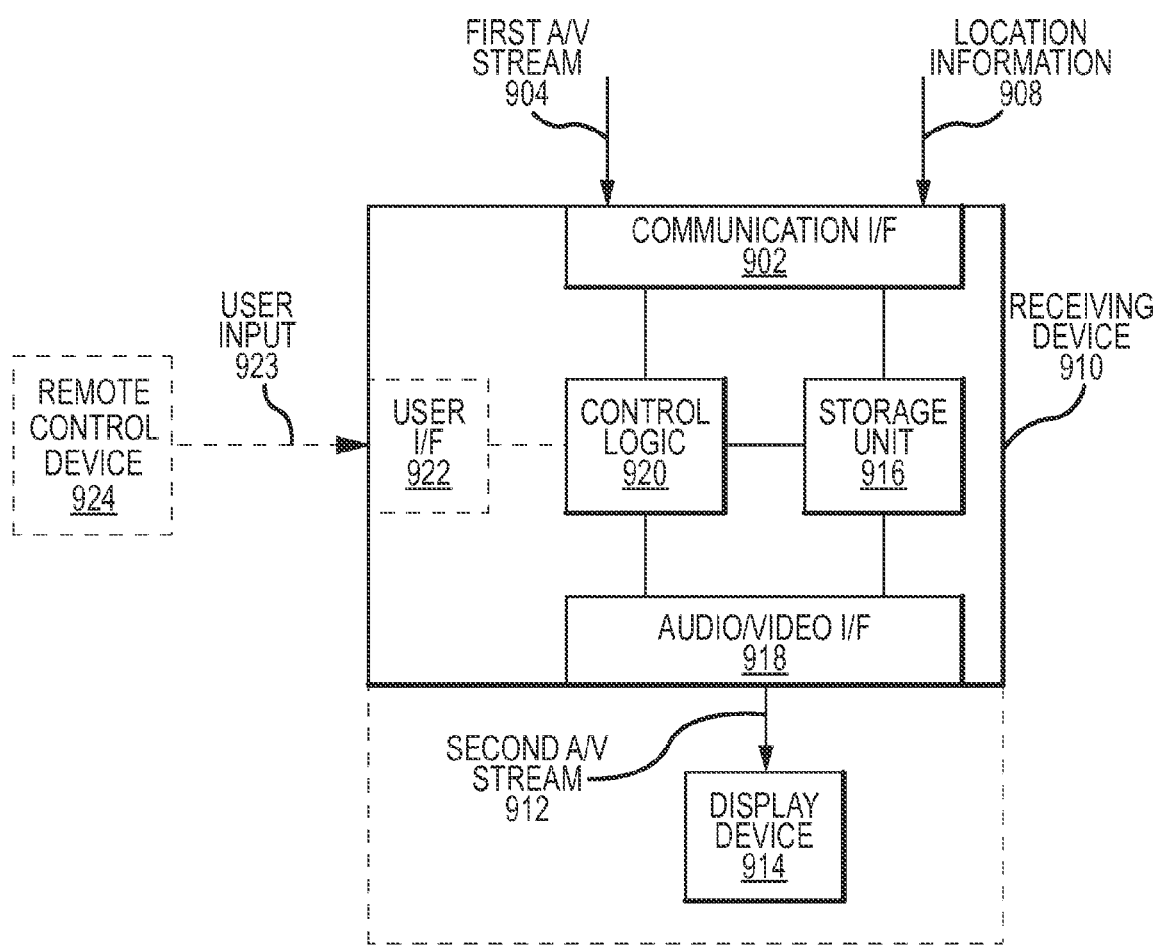
FIG. 9 illustrates a more explicit view of a receiving device according to one embodiment.

A more explicit view of a receiving device 910 according to one embodiment is illustrated in FIG. 9. The receiving device 910 includes a communication interface 902, a storage unit 916, an A/V interface 918 and control logic 920. In some implementations, a user interface 922 may also be employed in the receiving device 910. Other components possibly included in the receiving device 910, such as demodulation circuitry, decoding logic, and the like, are not shown explicitly in FIG. 9 to facilitate brevity of the discussion.

The communication interface 902 may include circuitry to receive a first A/V stream 904 and location information 908. If the receiving device 910 is a satellite set-top box, then the communication interface 902 may be configured to receive satellite programming, such as the first A/V stream 904, via an antenna from a satellite transponder. If, instead, the receiving device 910 is a cable set-top box, then the communication interface 902 may be operable to receive cable television signals and the like over a coaxial cable. In either case, the communication interface 902 may receive the location information 908 by employing the same technology used to receive the first A/V stream 904. In another implementation, the communication interface 902 may receive the location information 908 by way of another communication technology, such as the internet, a standard telephone network, or other means. Thus, the communication interface 902 may employ one or more different communication technologies, including wired and wireless communication technologies, to communicate with a communication network, such as the communication network 102 of FIG. 1.

Coupled to the communication interface 902 is a storage unit 916, which is configured to store the first A/V stream 904. The storage unit 916 may include any storage component configured to store one or more such A/V streams. Examples include, but are not limited to, a hard disk drive, an optical disk drive, and flash semiconductor memory. Further, the storage unit 916 may include either or both volatile and nonvolatile memory.

Communicatively coupled with the storage unit 916 is an A/V interface 918, which is configured to output A/V streams from the receiving device 910 to a display device 914 for presentation to a user. The A/V interface 918 may incorporate circuitry to output the A/V streams in any format recognizable by the display device 914, including composite video, component video, Digital Visual Interface (DVI), High-Definition Multimedia Interface (HDMI), Digital Living Network Alliance (DLNA), Ethernet, Multimedia over Coax Alliance (MOCA), WiFi and IEEE 1394. Data may be compressed and/or transcoded for output to the display device 914. The A/V interface 918 may also incorporate circuitry to support multiple types of these or other A/V formats. In one example, the display device 914, such as a television monitor or similar display component, may be incorporated within the receiving device 910, as indicated earlier.

In communication with the communication interface 902, the storage unit 916, and the A/V interface 918 is control logic 920 configured to control the operation of each of these three components 902, 916, 918. In one implementation, the control logic 920 includes a processor, such as a microprocessor, microcontroller, digital signal processor (DSP), or the like for execution of software configured to perform the various control functions described herein. In another embodiment, the control logic 920 may include hardware logic circuitry in lieu of, or in addition to, a processor and related software to allow the control logic 920 to control the other components of the receiving device 910.

Optionally, the control logic 920 may communicate with a user interface 922 configured to receive user input 923 directing the operation of the receiving device 910. The user input 923 may be generated by way of a remote control device 924, which may transmit the user input 923 to the user interface 922 by the use of, for example, infrared (IR) or radio frequency (RF) signals. In another embodiment, the user input 923 may be received more directly by the user interface 922 by way of a touchpad or other manual interface incorporated into the receiving device 910.

The receiving device 910, by way of the control logic 920, is configured to receive the first A/V stream 904 by way of the communication interface 902, and store the A/V stream 904 in the storage unit 916. The location information 908 is also received at the communication interface 902, which may pass the location information 908 to the control logic 920 for processing. In another embodiment, the location information 908 may be stored in the storage unit 916 for subsequent retrieval and processing by the control logic 920.

At some point after the location information 908 is processed, the control logic 920 generates and transmits a second A/V stream 912 over the A/V interface 918 to the display device 914. In one embodiment, the control logic 920 generates and transmits the second A/V stream 912 in response to the user input 923. For example, the user input 923 may command the receiving device 910 to output the first A/V stream 904 to the display device 914 for presentation. In response, the control logic 920 instead generates and outputs the second A/V stream 912. As described above in reference to FIG. 1, the second A/V stream 912 includes portions of the A/V data of the first A/V stream 904 presented at varying presentation streams.

Depending on the implementation, the second A/V stream 912 may or may not be stored as a separate data structure in the storage unit 916. In one example, the control logic 920 generates and stores the entire second A/V stream 912 in the storage unit 916. The control logic 920 may further overwrite the first A/V stream 904 with the second A/V stream 912 to save storage space within the storage unit 916. Otherwise, both the first A/V stream 904 and the second A/V stream 912 may reside within the storage unit 916. In another implementation, the second A/V stream 912 may not be stored separately within the storage unit 916. For example, the control logic 920 may instead generate the second A/V stream 912 "on the fly" by transferring selected portions of the audio data and the video data of the first A/V stream 904 in presentation order from the storage unit 916 to the A/V interface 918. If applicable, portions of the first A/V stream 904 may be processed and output at differing presentation rates (e.g., at faster or slower presentation rates).

In one implementation, a user may select by way of the user input 923 whether the first A/V stream 904 or the second A/V stream 912 is outputted to the display device 914 by way of the A/V interface 918. In other words, the user is able to select whether to watch the first A/V stream 904 at the real-time presentation rate (e.g., 1x) or whether to watch portions of the first A/V stream 904 at differing presentation rates (e.g., skipping over commercials or displaying them at a faster presentation rate). In another embodiment, a content provider of the first A/V stream 904 may prevent the user from maintaining such control by way of additional information delivered to the receiving device 910.

Figure 10:
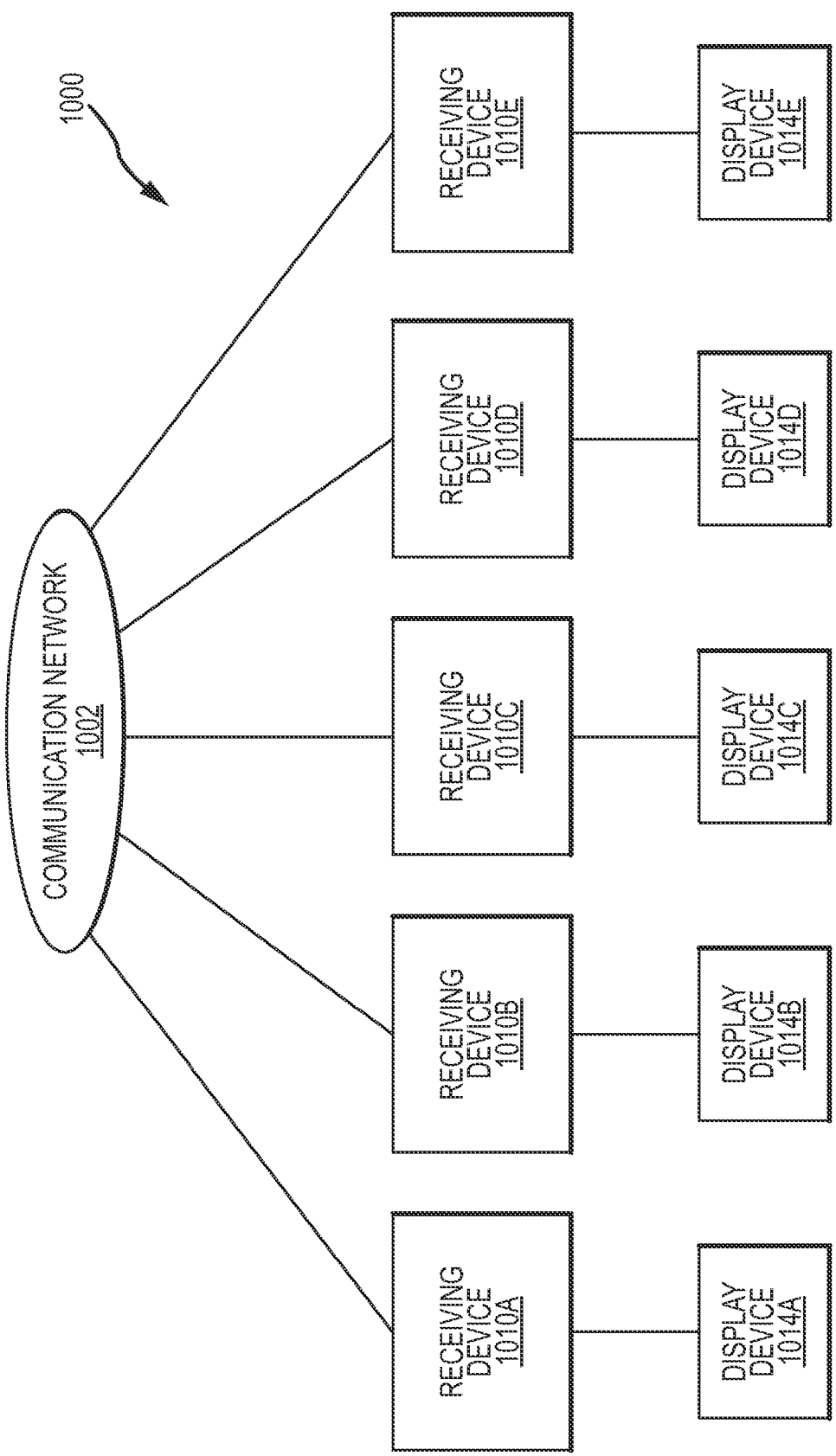
FIG. 10 illustrates an embodiment of a system including multiple receiving devices coupled to a communication network to receive A/V streams.

In a broadcast environment, such as that depicted in the system 1000 of FIG. 10, multiple receiving devices 1010A-E may be coupled to a communication network 1002 to receive A/V streams, any of which may be recorded, in whole or in part, by any of the receiving devices 1010A-E. In conjunction with any number of these A/V streams, location information for portions of the A/V stream which are to be presented at varying presentation rates and/or varying audio levels may be transferred to the multiple receiving devices 1010A-E. In response to receiving the A/V streams, each of the receiving devices 1010A-E may record any number of the A/V streams received. For any associated location information that are transmitted over the communication network 1002, each receiving device 1010A-E may then review whether the received location information are associated with an A/V stream currently stored in the device 1010A-E. If the associated stream is not stored therein, then the receiving device 1010A-E may delete or ignore the related and location information received.

In another embodiment, instead of broadcasting each location information data set, the transfer of an A/V stream stored within the receiving device 1010A-E to an associated display device 1014A-E may cause the receiving device 1010A-E to query the communication network 1002 for any outstanding location information that apply to the stream to be presented. For example, the communication network 1002 may include an internet connection. As a result, the broadcasting of each portion of location information would not be required, thus potentially reducing the amount of consumed bandwidth over the communication network 1002.

Figure 11:
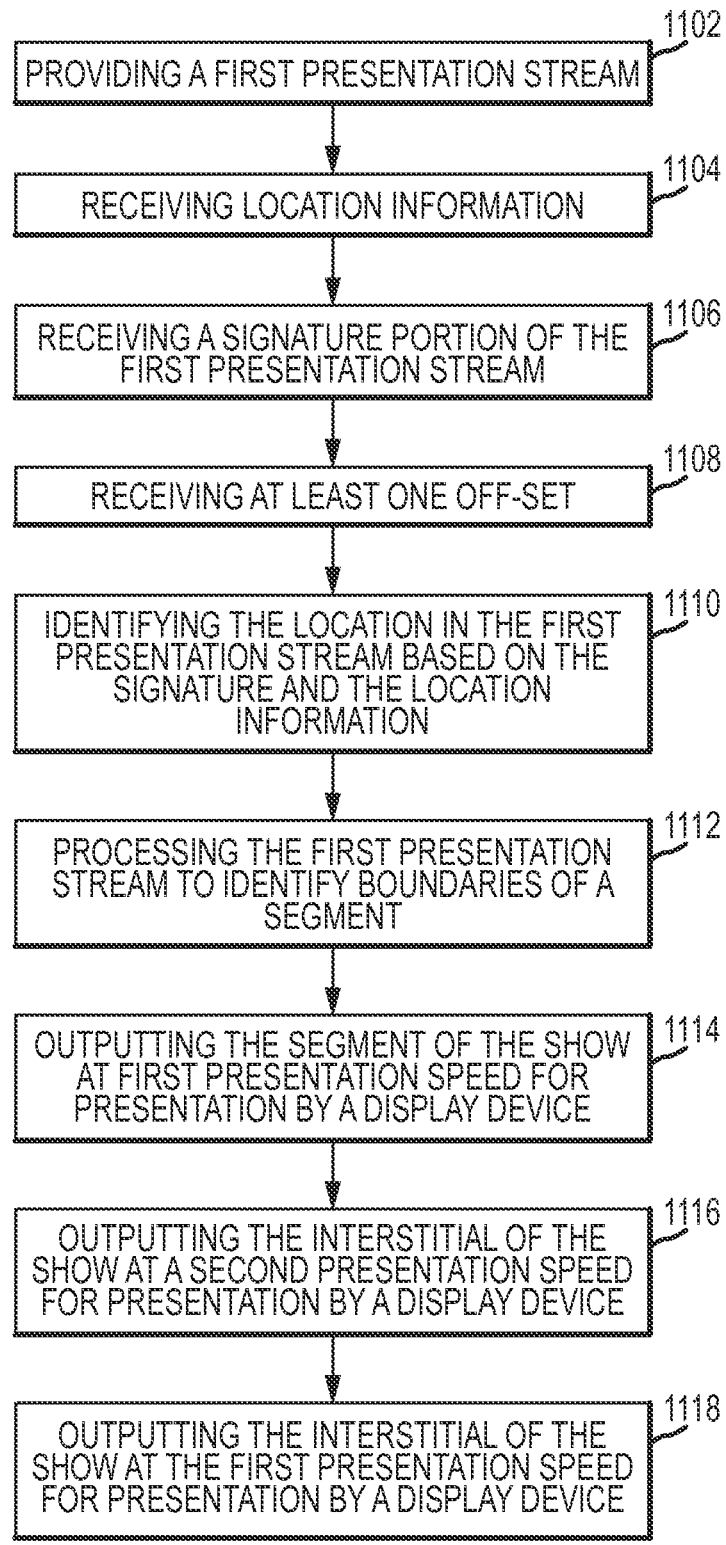
FIG. 11 illustrates an embodiment of a process for outputting a stream of data.

FIG. 11 illustrates an embodiment of a process for outputting a stream of data. More particularly, the process of FIG. 11 is operable for presenting portions of a presentation stream at varying presentation rates (e.g., fast forwarding through commercials). The process of FIG. 11 will be discussed in reference to modifying the presentation rate of interstitials in a presentation stream, but it is to be appreciated that the process of FIG. 11 may be operable to modify any portion of a presentation stream. The process of FIG. 11 may include other operations not illustrated for the sake of brevity.

The process includes providing a first presentation stream including at least one segment of a show and at least one interstitial of the show (operation 1102). In at least one embodiment, operation 1102 includes receiving the presentation stream from an external source. Operation 1102 may optionally include storing the first presentation stream for subsequent playback. In other embodiment, operation 1102 may include accessing the first presentation stream from a storage device. The process further includes receiving location information referencing a location within the first presentation stream (operation 1104). The process also includes receiving a signature of a portion of the first presentation stream corresponding with the location (operation 1106) and receiving at least one-offset, specified relative to the location (operation 1108).

Still further, the process includes identifying the location in the first presentation stream based on the signature and the location information (operation 1110). Responsive to identifying the location, the process includes processing the first presentation stream to identify boundaries of the segment of the show based on the identified location and the off-set (operation 1112). The process further includes outputting the segment of the show at a first presentation rate for presentation by a display device (operation 1114) and outputting the interstitial of the show at a second presentation rate for presentation by the display device (operation 1116). In at least one embodiment, the second presentation rate is greater than the first presentation rate.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

What is claimed is:

1. A method for processing an audio/video stream, the method comprising:
   receiving an audio/video stream including at least one segment of a show and at least one interstitial of the show;
   receiving location information to identify a video location within the audio/video stream, wherein receiving the location information occurs contemporaneously with the step of receiving the audio/video stream;
   automatically, and without user input, processing the audio/video stream to identify boundaries of the at least one segment of the show based on the location information;
   outputting the segment of the show for presentation by a display device while not outputting the interstitial, wherein not outputting the interstitial is performed automatically without user input; and
   outputting the interstitial for presentation by the display device subsequent to outputting the segment of the show, wherein outputting the interstitial subsequent to outputting the segment occurs automatically without user input.

2. The method of claim 1, wherein outputting the at least one interstitial comprises rewinding the audio/video stream to a beginning boundary of the at least one interstitial.

3. The method of claim 1, wherein receiving the location information comprises receiving the location information separately from the audio/video stream.

4. The method of claim 3, wherein processing the audio/video stream further comprises identifying boundaries of the at least one interstitial.

5. The method of claim 4, wherein the location information includes at least one text string.

6. A method for processing an audio/video stream, the method comprising:
   receiving an audio/video stream including at least one segment of a show and at least one interstitial of the show;
   receiving location information referencing the interstitial of the show to identify a video location within the audio/video stream, wherein receiving the location information occurs contemporaneously with the step of receiving the audio/video stream;
   automatically, and without user input, processing the audio/video stream to identify boundaries of the at least one segment of the show;
   outputting the segment of the show at a first presentation rate for presentation by a display device;
   outputting the interstitial of the show at a second presentation rate for presentation by the display device, wherein outputting the interstitial at the second presentation rate is performed automatically without user input; and
   subsequent to outputting the segment of the show, outputting the interstitial of the show at the first presentation rate for presentation by the display device, wherein outputting the interstitial at the first presentation rate subsequent to outputting the segment occurs automatically without user input.

7. The method of claim 6, wherein the second presentation rate is greater than the first presentation rate.

8. The method of claim 6, wherein receiving the location information comprises receiving the location information separately from the audio/video stream.

9. The method of claim 6, further comprising: receiving a signature of a portion of the audio/video stream associated with the video location; wherein processing the audio/video stream to identify the boundaries is further based on processing of the signature.

10. The method of claim 9, wherein the location information includes at least one text string.

11. A digital video recorder comprising:
a communication interface that receives an audio/video stream including at least one segment of a show and at least one interstitial of the show;
a storage medium;
control logic communicatively coupled to the communication interface and the storage medium that:
coordinates storage of the audio/video stream onto the storage medium;
receives location information to identify a video location within the audio/video stream, wherein receiving the location information occurs contemporaneously with the step of receiving the audio/video stream; and
automatically, and without user input, processes the recorded audio/video stream to identify boundaries of the at least one segment of the show;
an audio/video interface communicatively coupled to the control logic that outputs the segment of the show for presentation by a display device while not outputting the interstitial, wherein not outputting the interstitial is performed automatically without user input, and, subsequently to outputting the segment, outputs the interstitial for presentation by the display device, wherein the audio/video interface outputs the interstitial subsequent to outputting the segment automatically without user input.

12. The digital video recorder of claim 11, wherein the audio/video interface is configured to process a plurality of audio/video streams.

13. The digital video recorder of claim 11, wherein the control logic receives the location information separately from the audio/video stream.

14. The digital video recorder of claim 13, wherein the control logic is further operable to receive a signature of a portion of the audio/video stream associated with the video location and process the audio/video stream to identify the boundaries based on the signature.

15. The digital video recorder of claim 14, wherein the location information includes at least one text string.

16. A digital video recorder comprising:
a communication interface that receives an audio/video stream including at least one segment of a show and at least one interstitial of the show;
a storage medium;
control logic communicatively coupled to the communication interface and the storage medium that:
coordinates storage of the audio/video stream onto the storage medium;
receives location information to identify a video location within the audio/video stream, wherein receiving the location information occurs contemporaneously with the step of receiving the audio/video stream; and
automatically, and without user input, processes the recorded audio/video stream to identify boundaries of the at least one segment of the show;
an audio/video interface communicatively coupled to the control logic that outputs the segment of the show at a first presentation rate for presentation by a display device, outputs the interstitial of the show at a second presentation rate for presentation by the display device, wherein outputting the interstitial at the second presentation rate is performed automatically without user input, and subsequent to outputting the segment of the show, outputs the interstitial of the show at the first presentation rate for presentation by the display device, wherein the audio/video interface outputs the interstitial at the first presentation rate subsequent to outputting the segment automatically without user input.

17. The digital video recorder of claim 16, wherein the second presentation rate is greater than the first presentation rate.

18. The digital video recorder of claim 17, wherein the control logic receives the location information separately from the audio/video stream.

19. The digital video recorder of claim 18, wherein the control logic is further operable to receive a signature of a portion of the audio/video stream associated with the video location and process the audio/video stream to identify the boundaries based on the signature and the location information.

20. The digital video recorder of claim 19, wherein the location information includes at least one text string.

* * * * *